ced for iron and steel molding or core purposes.

UNITED STATES PATENT OFFICE.

ANDREW POULSON, OF FARNWORTH, ENGLAND.

TREATMENT OF FOUNDRY-SAND.

1,052,514. Specification of Letters Patent. Patented Feb. 11, 1913.

No Drawing. Application filed April 14, 1911. Serial No. 621,020.

*To all whom it may concern:*

Be it known that I, ANDREW POULSON, a subject of the King of Great Britain, and a resident of Farnworth, England, have invented certain new and useful Improvements in the Treatment of Foundry-Sand, of which the following is a specification.

This invention has reference to the treatment of foundry sand or the like which has been used in the making of molds or cores for casting metals, and the object of the invention is to renovate such spent sand so as to restore its cohesive properties while retaining its porous properties and make it again suitable for molding or core making.

The invention may be applied to the renovation of spent molding sand or to the treatment of fresh sand which has not sufficient cohesive properties for use as a foundry sand.

According to the present invention I take commercial sulfate of aluminum, or other compound or compounds of aluminum, and grind it or them in the dry state to a fine powder, which is then mixed with the spent sand, water being added to the mixture as required; or the sulfate or other soluble compound or compounds of aluminum may be used in lump form and heated water added to dissolve the sulfate or other soluble compound or compounds or the sulfate or other compound or compounds of aluminum may be ground and mixed with water to form a paste or liquid such paste or liquid being then added to the sand. Either of these processes has the effect of renovating the sand and making it suitable for iron and steel molding or core purposes.

In a modification of the invention, I take aluminoferric cake and add it to the sand, water being then added to the mixture until the required consistency is obtained, or, alternatively, the aluminoferric cake may be dissolved in water and silicate of soda in as pure a form as possible then added, the resulting mixture being finally added to the spent sand.

While both of the foregoing processes are suitable for the purpose of this invention, I prefer to renovate the sand by treating it with a solution of sulfate of aluminum in the following manner: I make a solution of sulfate of aluminum in the proportion of about 1 lb. of sulfate of aluminum to 12 lbs. of water, 160 lbs. of this solution being used per ton of spent sand for molding purposes, while for cores, and dry sand work more of the sulfate of aluminum solution per ton of sand would be desirable.

To get a better consistency in the sand for molding and core making I prefer to employ the sulfate of aluminum treatment, as just described, in combination with gelatinous silica or silicate of soda in a neutral form. To secure a better consistency in the sand for molding and core making, I prefer to employ the sulfate of aluminum treatment just described in combination with gelatinous silica or silicate of soda in a neutral form which would act as a diluent for the sulfate of aluminum. In order to do this I take equal parts by weight of the sulfate of aluminum solution as above and of gelatinous silica or silicate of soda in neutral form, to form a mixture which is added to the spent or other sand for renovating or the like purposes in the proportion of, say, 160 lbs. of the mixture of the solution of sulfate of aluminum and gelatinous silica or silicate of soda in a neutral form to every ton of sand to be treated.

For the making of cores and for dry sand molding, the treatment of the spent sand by means of a simple solution of sulfate of aluminum is preferable, while for the renovation of green sand it is preferred to use the combined treatment by means of sulfate of aluminum solution and gelatinous silica or silicate of soda in a neutral form.

I claim.

1. The process of treating foundry sand which consists in adding sulfate of aluminum to the sand.

2. The process of treating foundry sand which consists in adding sulfate of aluminum and a suitable diluent to the sand.

In testimony whereof I affix my signature in presence of two witnesses.

ANDREW POULSON.

Witnesses:
  A. J. DAVIS,
  LEON F. LEAVITT.